Figure 4:
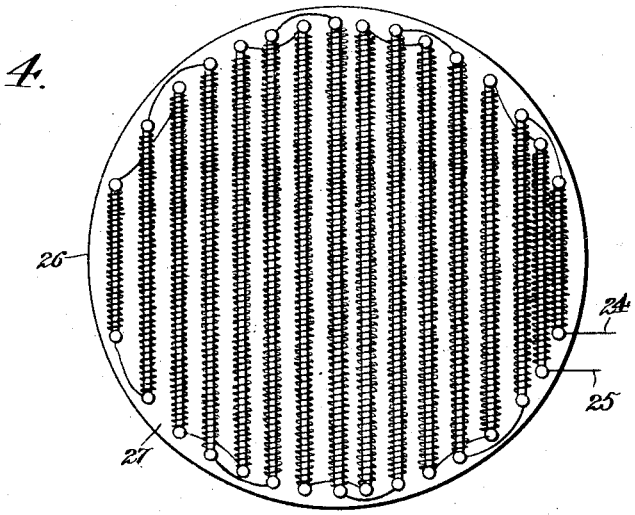

S. G. ROBERTS.
WATER HEATER.
APPLICATION FILED MAR. 3, 1915.
1,194,785.
Patented Aug. 15, 1916.
4 SHEETS—SHEET 1.
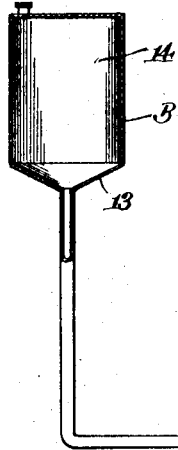
Fig. 1.
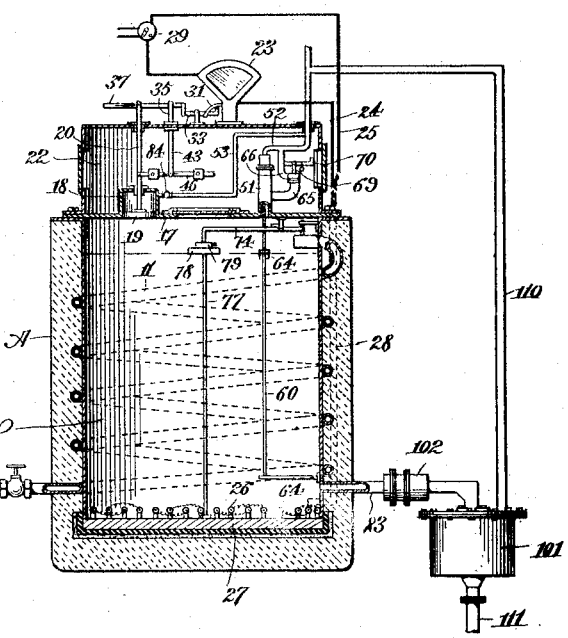
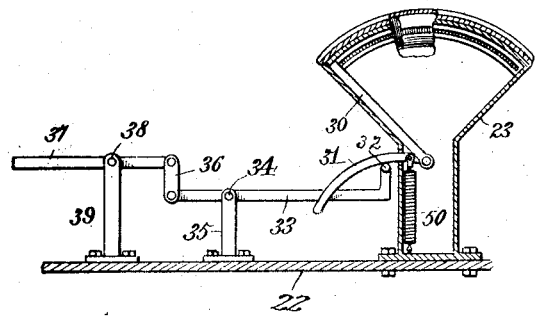
Fig. 2.
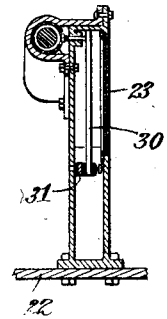
Fig. 3.
Witnesses:
C. Feinler Jr.
H. R. Parker
Inventor,
S. G. Roberts.
By Victor J. Evans,
Attorney.

S. G. ROBERTS.
WATER HEATER.
APPLICATION FILED MAR. 3, 1915.

1,194,785.

Patented Aug. 15, 1916.
4 SHEETS—SHEET 2.

Witnesses
C. Feinle, Jr.

Inventor,
S. G. Roberts
By Victor J. Evans,
Attorney.

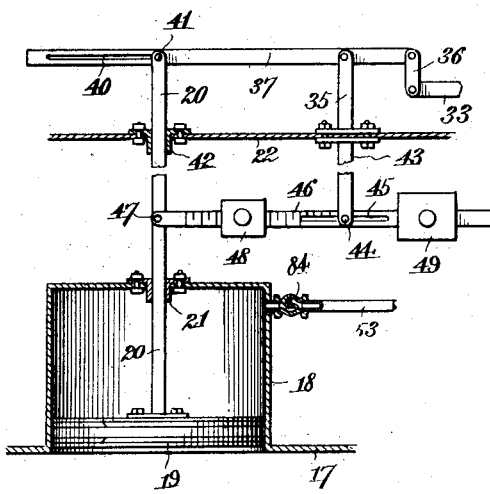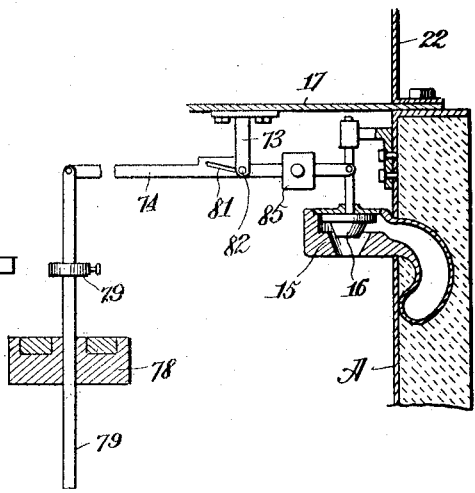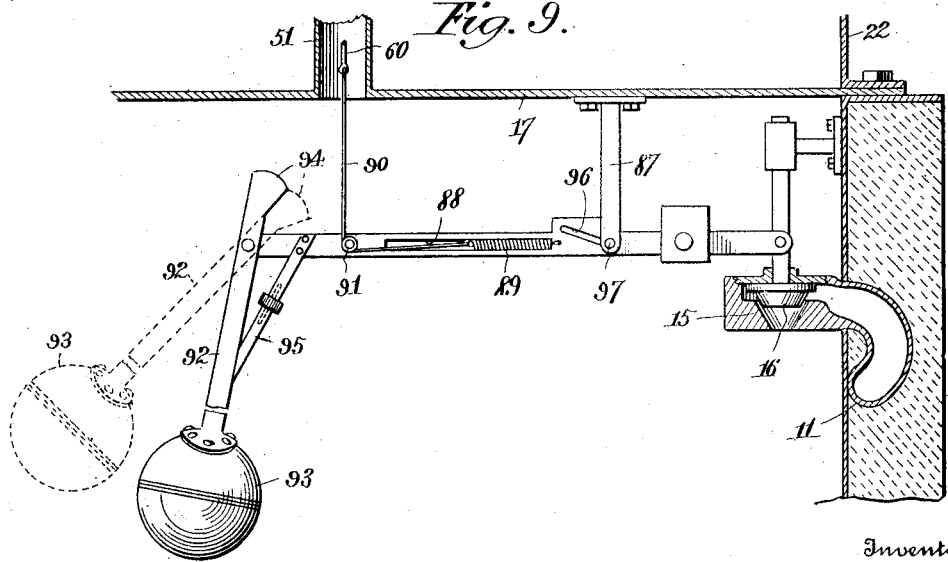

S. G. ROBERTS.
WATER HEATER.
APPLICATION FILED MAR. 3, 1915.

1,194,785.

Patented Aug. 15, 1916.
4 SHEETS—SHEET 4.

Inventor,
S. G. Roberts.

Witnesses:
By Victor J. Evans,
Attorney.

UNITED STATES PATENT OFFICE.

SUMMERFIELD G. ROBERTS, OF BOSTON, MASSACHUSETTS.

WATER-HEATER.

1,194,785.   Specification of Letters Patent.   Patented Aug. 15, 1916.

Application filed March 3, 1915. Serial No. 11,795.

*To all whom it may concern:*

Be it known that I, SUMMERFIELD G. ROBERTS, a citizen of the United States, residing at Boston, in the county of Suffolk and State of Massachusetts, have invented new and useful Improvements in Water-Heaters, of which the following is a specification.

The invention relates to water heaters, and more particularly to the class of electro-automatic water heaters.

The primary object of the invention is the provision of an apparatus of this character wherein water can be heated to any desired temperature, the degree of heat being automatically controlled and is derived from an electric source which is regulated automatically under steam pressure, the apparatus being of novel form to assure the accurate and perfect working thereof.

Another object of the invention is the provision of an apparatus of this character wherein the steam pressure for controlling the electric heating device is automatically regulated so that the water to be heated will reach a predetermined temperature as may be desired, and also the quantity of water to be heated can be regulated as the occasion may require.

A further object of the invention is the provision of an apparatus of this character wherein a determined amount of water when heated can be discharged therefrom, and various degrees of heat can be had for the heating of the water, the pressure of steam being designed to automatically regulate the electric energy for the heating of the water, which steam pressure is controlled to determine a degree of heat of the water.

A still further object of the invention is the provision of an apparatus of this character wherein the supply of water thereto and the discharge of the heated water therefrom is automatically controlled, and likewise the electric heater for the water is automatically regulated so that various degrees of heated water can be had.

A still further object of the invention is the provision of an apparatus of this character which is simple in construction, thoroughly reliable and efficient in operation, strong, durable, and inexpensive in manufacture and installation.

With these and other objects in view, the invention consists in the construction, combination and arrangement of parts as will be hereinafter fully described, illustrated in the accompanying drawing, and pointed out in the claims hereunto appended.

Figure 5:
Figure 6:
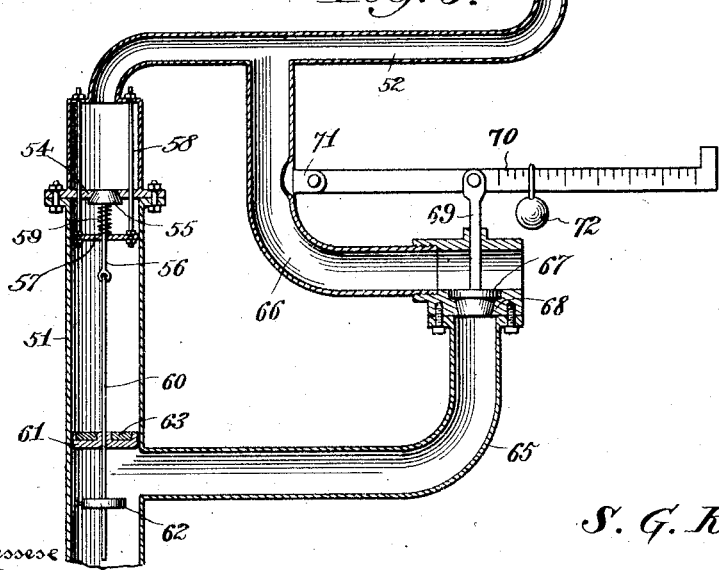
Figure 10:
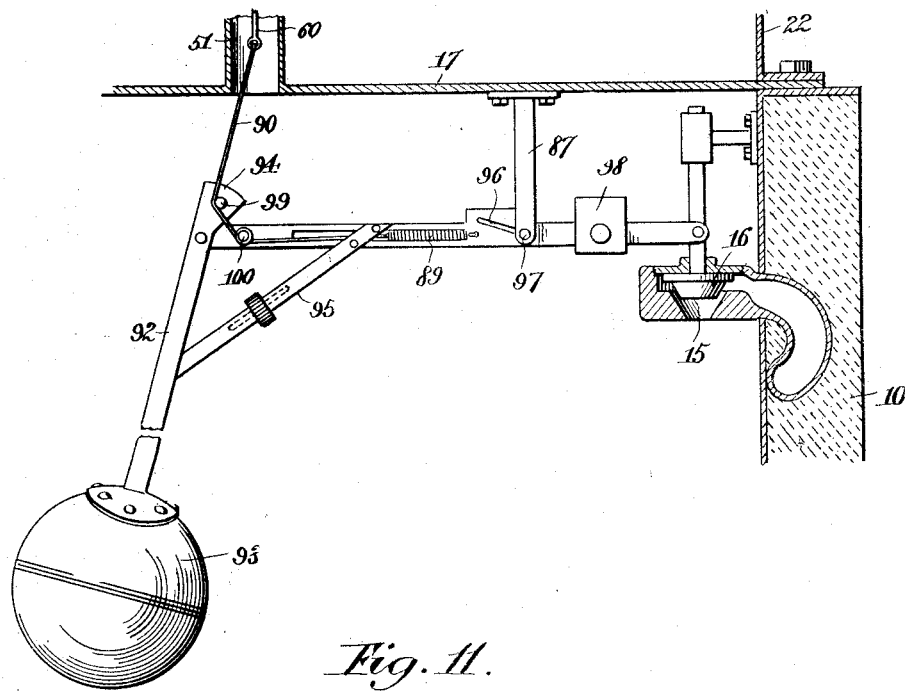
Figure 11:
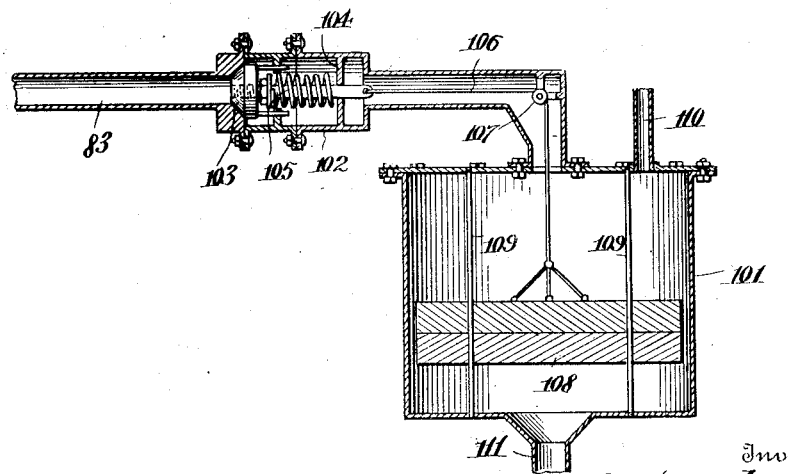

In the drawings:—Figure 1 is a vertical sectional elevation of an electro-automatic water heater constructed in accordance with the invention. Fig. 2 is an enlarged fragmentary front elevation of the lever operated electric rheostat. Fig. 3 is a vertical transverse sectional view therethrough. Fig. 4 is a plan view of the electric heating coil. Fig. 5 is a vertical sectional view therethrough. Fig. 6 is a fragmentary enlarged vertical sectional view showing in detail the automatic steam escape valve and safety valve. Fig. 7 is a fragmentary vertical sectional view showing in detail the steam pressure cylinder and pressure adjustment. Fig. 8 is a fragmentary vertical sectional view showing in detail the automatic adjustable water inlet valve. Fig. 9 is a detail elevation, showing a modified form of automatically adjustable inlet valve. Fig. 10 is a similar view, showing another modified form of automatically adjustable inlet valve. Fig. 11 is a fragmentary vertical sectional view of an automatic water or steam pressure reducer on pipe line to house.

Similar reference characters indicate corresponding parts throughout the several views in the drawings.

Referring to the drawings in detail, A designates generally the electro-automatic water heater, and B the water supply reservoir connected thereto, the heater being hereinafter fully described.

The water heater A comprises a double walled receptacle or container 10, having arranged interiorly between said walls thereof a water inlet coil 11 which at one end is joined to a supply pipe 12 leading from the hopper-shaped bottom 13 of the reservoir B, which is in the form of a tank 14 disposed at an elevation above the discharge end of the water inlet coil 11, which is formed with a valve seat 15 at its discharge end for accommodating a cut-off valve 16, which is automatically operated in a manner presently described.

The receptacle or container 10 has bolted or otherwise secured thereto a cover plate or head 17 formed with a steam pressure cylinder 18 in which works a steam pressure piston 19, the stem or rod 20 of which works through a stuffing box or packing gland 21, centrally of the closed end of the cylinder 18, the latter being in communication with the receptacle or container 10, and upon this cover plate or head 17 is supported a hood or dome 22 on which is mounted a lever operated electric rheostat 23. The coil of the rheostat 23 and its lever are arranged in series with an electric circuit including the conductor wires 24 and 25. Also arranged in series with this circuit including the wires 24 and 25 is an electric resistance coil 26 forming a heater, the frame 27 of which is disposed contiguous to the bottom of the receptacle or container 10 interiorly thereof and is suitably insulated therefrom. The conductor wires of the electric circuit to the coil 26 are passed through an insulator tube 28 embedded within the side wall of the receptacle or container 10, as shown, for assisting in the saving of electric current or energy in the electric circuit has arranged in series therewith a hand operable cut-off switch 29 of any suitable type.

Connected to the lever 30 of the rheostat 23 at its pivoted end is a cam or arcuate shaped arm 31 which rests upon a lug 32 formed on the upstanding limb of an L-shaped rocking arm 33 pivoted at 34 in a post or bearing 35 mounted on the hood or dome 22, while pivotally connected to the free end of the shorter limb of the arm 33 is a link 36 which is also pivoted to a rocking arm 37 pivoted at 38 in a post or bearing 39 mounted upon the hood or dome 22 spaced from the post or bearing 35, the arm 37 being formed with an elongated slot 40 in which works a pin 41 carried in the stem or rod 20 of the piston 19, which stem or rod is extended and works through a packing ring 42 on the dome or hood 22 so that on the rise or fall of the piston 19 within the cylinder 18 under the action of steam pressure within the heater A the lever 30 of the rheostat 23 will be automatically shifted for increasing or decreasing the electric current to the heating coil 26, which is designed to heat the water contained within the receptacle or container 10. Secured to and depending from the hood or dome 22 is a hanger 43 provided with a guide pin 44 which engages and works in a slot 45 formed in a weight carrying arm 46 which is pivoted at 47 to the stem or rod 20 of the piston 19, and upon this arm 46 at opposite sides of the pin 44 in the hanger 43 are adjustable weights 48 and 49, respectively, the latter being larger than the weight 48, and these weights when adjusted serve to keep any desired steam pressure in the heater, and determine the pounds pressure of steam required for the lifting of the piston 19 in the steam cylinder 18 for varying the electric current to the resistance coil 26 for the heating of the water within the heater to a predetermined degree of temperature, as the occasion may require.

Connected to the cam or arcuate shaped arm 31 is one end of a coiled retractile spring 50 which has its opposite end connected to the base of the rheostat 23 and is adapted to return the lever 30 to normal position on the decreasing of the steam pressure within the receptacle or container 10 of the heater, and also this spring serves to hold the said arm or lever 31 in contact with the lug 32 on the arm 33 at all times.

Formed on and rising from the cover plate or head 17 on the receptacle or container 10 is a steam outlet column or tube 51 from which leads a steam exhaust pipe 52 which has tapped therein a steam and air vent tube 53 leading from the steam cylinder 18 to allow the escape of any pressure of steam or air that may arise behind the piston 19 in the said cylinder. Within the steam outlet column or tube 51 is a valve seat 54 adapted to be normally engaged by means of a valve 55, the stem 56 of which works through a bridge plate 57 suspended from adjustable hanger rods 58, and surrounding this stem 56 is a coiled expansion spring 59 which works against the valve 55 and the said bridge plate 57 which is adapted to normally seat the valve 55 to prevent the exhaust of steam from the receptacle or container 10 through the column or tube 51 to the exhaust pipe 52, the valve 55 being automatically opened in a manner presently described.

Connected to the stem 56 of the valve 55 is a float guide rod 60, on which is mounted a slidable float 61 adapted to be moved up and down within the receptacle or container 10 as the water therein rises and falls. Adjustably mounted on the rod 60 is an abutment block 62 with which is adapted to contact the float 61 which is loaded with lead strips 63 for displacing the rod 60 on the lowering of the water within the receptacle or container 10 to a predetermined point so that the valve 55 will become unseated from the seat 54 to permit the escape of steam from the receptacle or container to the steam exhaust pipe 52, thereby relieving the steam pressure within the heater. The guide rod 60 is slidably fitted in a guide bearing 64 mounted interiorly of the heater A, as shown.

Leading from one side of the steam outlet column or tube 51 is a safety vent or outlet 65, from which extends an elbow pipe 66 opening into the steam exhaust pipe 52, and this outlet 65 is controlled through the medium of a safety valve 67 adapted to engage the seat 68 for the closing of the said outlet 65, the stem 69 of the said valve 67 being pivotally connected to a weight carrying arm 70 pivoted in a bearing 71 formed on the elbow pipe 66, the arm 70 being fitted with the usual adjustable weight 72 so that the valve 67 can be set to open at any desired pressure by the adjustment of the said weight 72 on the arm 70 so that pressure of steam above a predetermined point within the heater A can be automatically let off on the operation of the safety valve. It is of course to be understood that the adjustment of the safety valve must be consistent with the adjustment of the steam pressure piston 19 so as to have the safety valve operate after the rheostat has been thrown off, or before if desired, consequently keeping the water at a maximum temperature.

Depending from and fixed to the cover plate or head 17 is a hanger 73 in which is fulcrumed a rocking valve operating lever 74, the same being pivoted to the stem 75 of the valve 16, and this stem is movable through guides 76 mounted interiorly of the heater A so as to insure the proper seating of the valve 16 on the seat 15 when closed, while pivotally connected to the opposite end of the lever 74 is a float guide rod 77 on which is fitted a slidable float 78 controlled by the rise and fall of the water contained within the heater, the float being designed to operate the valve 16, and to accomplish this there are mounted spaced abutment blocks 79 and 80, respectively, on the guide rod 77, thus it being seen that on the lifting of the float 78 it will contact with the block 79 for the closing of the valve 16, and on the lowering of the said float 78 it will contact with the block 80 for the opening of this valve 16, and thereby regulating the quantity of water delivered to the heater. The lever 74 is formed with a diagonal slot 81 for receiving the pivot 82 in the hanger 73, the slot 81 being designed to permit the lateral shifting of the lever 74 so that the valve stem 75 when being moved thereby will be sustained in perpendicular position for the proper seating of the valve 16 thereof. The blocks 78 and 80 on the guide rod 77 are adjustable so as to vary the time of opening and closing of the valve 16 during the working of the heater.

Leading from the receptacle or container 10 is a water outlet pipe 83 which is adapted to be connected with a house main of any ordinary well-known construction, and arranged in this pipe is an automatic water steam pressure reducer hereinafter fully described.

Located within the escape tube 53 is a steam pressure lift valve 84 which allows escape of back pressure through the said tube from the steam cylinder 18.

Mounted on the lever 74 is an adjustable weight 85 which serves as a balance, and when adjusted facilitates the opening and closing of the valve controlled thereby.

In Fig. 9 of the drawings there is shown a modified form of automatic adjustable water inlet valve which comprises a valve operating lever 86, fulcrumed in a hanger 87 fixed to and depending from the cover plate or head 17, and this lever is pivoted to the stem of the valve 16 and is formed with a slot 88 accommodating a coiled retractile spring 89 which has one end fixed to the lever 86 and its opposite end connected with a flexible cable 90, the latter being trained over a guide pulley 91 suitably journaled in the lever 86, the cable 90 being also connected to the steam escape valve 55, which is automatically opened on the lowering of the free end of the lever 86, which end has pivotally connected thereto the swinging arm 92 of a ball float 93 which is adapted to rise and fall with the water level in the receptacle or container 10, the arm 92 being formed with a nose 94 which is adapted to engage the lever 86 on the raising of the float so that the lever will be moved to close the valve 16, and during this movement the steam valve is also closed. Fixed to the lever 86 is an adjustable stop 95 with which is adapted to contact the arm 92 when the float becomes lowered on the receding of the water within the receptacle or container 10 so that the valve 16 will be automatically opened and the steam valve opened. When the water recedes in the receptacle or container 10 by using the said water, the float 93 lowers with the level of the water, and its arm 92 hits the stop 95, which causes the lever 86 to be forced downward by the weight of the float, and this motion pulls the cable 90, thus opening the steam valve, and after this has been effected the spring 89 takes up the remainder of the downward motion of the said lever, which is provided with the angular slot 96 receiving the pivot pin 97 in the hanger 87 to facilitate the opening and closing of the valve 16, and also serves to keep the stem of the said valve and the cable in a perpendicular line, and on this remaining downward movement of the lever the valve 16 is opened to allow the water to enter the receptacle or container. As the water rises by virtue of the open valve 16, the float 93 moves upward until the nose 94 strikes the lever 86, and then the valve 16 is closed, and also the steam valve, and this automatic action is continued as the water rises and recedes by being drawn out for use. The lever 86 carries a weight 98 which is readily adjustable and serves as a balance.

In Fig. 10 there is shown a still further modification of the automatically adjustable water inlet valve, wherein the construction thereof differs only from the construction of the other modification hereinbefore set forth by having the cable 90 engaged over a lug 99 mounted on the nose end 94 of the arm 92 carrying the float 93, and the adjustable stop 100 is fixed in the slot 88 for the spring 89, and by this construction it allows the steam valve to open gradually before the valve 16 starts to open, thus having the steam pressure reduced when the arm 92 contacts with the stop 100 to cause the valve 16 to open.

The automatic water steam pressure reducer comprises a trap 101 which intersects the water outlet pipe 83 which on the side next to the receptacle or container 10 is formed with a valve casing 102 in which is arranged a cut off valve 103, the stem of which slides through a spring support 104 in the said casing for the spring 105 which has its bearing against the support and the valve 103, and serves to close the valve for shutting off the delivery of water from the receptacle to the house main. The stem of the valve 103 has connected thereto a cable 106 which is trained over a guide pulley 107 suitably mounted within the said pipe 83, and this cable is also connected with a float 108 arranged within the trap 101, and guided in its movement through the medium of guide rods 109 in the said trap, which latter is formed with a steam escape vent 110 leading from its top. Now, the spring 105 is adjusted so that the weight of the float 108 will open the valve 103 when water in the trap 101 recedes through the outlet 111 from said trap to the house main. When the water is reduced in the trap the valve 103 opens, thus allowing water to enter the said trap from the receptacle or container 10, and when the consumption is cut off to the house system the float 108 rises, and thus the valve 103 is again closed, it being understood of course that the spring 105 is to be adjusted so that the safety valve of the heater will open before the pressure of the water or steam will open the said valve 103, and when the water enters the trap it lifts the float for the automatic closing of the said valve, thereby shutting off the supply from the receptacle or container to the trap. By the presence of the escape pipe from the trap, the pressure of the steam and water in the valve casing is greatly reduced when it enters the said trap, because of the capacity thereof and the escape tube which is adapted to lead to the steam escape of the heater.

In the operation of the apparatus, water is permitted to enter the heater A through the pipe or coil 11 on the opening of the valve 16, and the said heater will become automatically filled from the reservoir B, and upon turning on the electric switch in the electric circuit the full current passes through the rheostat for the heating of the resistance coil 26, which becomes hot and consequently heats the water in the heater. Now, as the water becomes hot prior to the delivery of the same from the heater, steam pressure will be formed above the water level in the heater, and this pressure forces the piston 19 in the cylinder 18 upwardly, and when this is done the rheostat lever 30 is pushed from the left hand side to the right hand side of the said rheostat, causing a reduction of current to the coil 26, and when the said lever arrives at the right hand side of the rheostat the current is shut off, thereby controlling the temperature of the water within the heater. By adjusting the weights 48 and 49 on the arm 46 various pressures of steam and consequently various degrees of heat of the water can be had within the receptacle or container 10 before the lever 30 of the rheostat 23 has moved to shut off the current. Should water be discharged from the receptacle or container 10, the floats controlling the steam outlet and the water inlet from and to the receptacle or container will descend with the water level and the stops for the said float will have been adjusted so as to limit the movement thereof at any desired level, it being understood of course that the stop for the float controlling the steam valve must always be disposed higher than the stop for controlling the water inlet valve so that the float controlling the steam valve will operate first to open the latter, which allows the steam to escape from the receptacle or container prior to the opening of the water inlet valve, which is controlled by the float operating the same. Now, when the water inlet valve is opened the water enters the receptacle or container 10, and on the rise of the floats both valves for controlling the water inlets and the steam outlets will be automatically closed for the heating of the water, as the lever 30 of the rheostat 23 will be automatically moved to normal position for the preheating of the coil 26 which heats the water.

From the foregoing description, taken in connection with the accompanying drawings, the construction and manner of operation of the device will be clearly understood, and therefore a more extended explanation has been omitted.

What is claimed is:—

1. The combination with a rheostat having a movable arm and a fluid cylinder, of a head fixed to said cylinder and having a piston cylinder, a piston working within the piston cylinder and operated upon by the fluid contained in the fluid cylinder, brackets stationarily mounted above the head, a rocking lever pivoted to one of said brackets, a stem connected with the piston and having slidable connection with said rocking lever, an arcuate extension formed on the arm of the rheostat, a second rocking lever supported above the head and having connection with said first named rocking lever, a lug on the second named lever and acting against the extension on the arm, a weight carrying arm pivoted to the other bracket and also pivoted to the said stem, and adjustable weights on said arm at opposite sides of its pivotal connection with the bracket.

2. The combination with a rheostat having a movable arm and a fluid cylinder, of a head fixed to said cylinder and having a piston cylinder, a piston working within the piston cylinder and operated upon by the fluid contained in the fluid cylinder, brackets stationarily mounted above the head, a rocking lever pivoted to one of said brackets, a stem connected with the piston and having slidable connection with said rocking lever, an arcuate extension formed on the arm of the rheostat, a second rocking lever supported above the head and having connection with said first named rocking lever, a lug on the second named lever and acting against the extension on the arm, a weight carrying arm pivoted to the other bracket and also pivoted to the said stem, adjustable weights on said arm at opposite sides of its pivotal connection with the bracket, and a coiled retractile spring having connection with the extension and the said arm of the rheostat for bringing the arm to normal position upon a reduction in the fluid pressure within the first named cylinder.

In testimony whereof I affix my signature in presence of two witnesses.

SUMMERFIELD G. ROBERTS.

Witnesses:
EDWARD M. DEALEY,
ARTHUR C. SCOTT, Jr.

Copies of this patent may be obtained for five cents each, by addressing the "Commissioner of Patents, Washington, D. C."